US012006761B2

(12) United States Patent
Persson et al.

(10) Patent No.: US 12,006,761 B2
(45) Date of Patent: Jun. 11, 2024

(54) PANEL FRAME AND A METHOD FOR PROVIDING A PANEL

(71) Applicant: Assa Abloy Entrance Systems AB, Landskrona (SE)

(72) Inventors: Magnus Persson, Helsingborg (SE); Mikael Buschow, Malmo (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 0 days.

(21) Appl. No.: 17/909,702

(22) PCT Filed: Mar. 18, 2021

(86) PCT No.: PCT/EP2021/056901
§ 371 (c)(1),
(2) Date: Sep. 6, 2022

(87) PCT Pub. No.: WO2021/185941
PCT Pub. Date: Sep. 23, 2021

(65) Prior Publication Data

US 2023/0122527 A1 Apr. 20, 2023

(30) Foreign Application Priority Data

Mar. 19, 2020 (SE) .................................... 2030093-5

(51) Int. Cl.
*E06B 3/54* (2006.01)
*E06B 3/02* (2006.01)
*E06B 3/90* (2006.01)
*E06B 7/23* (2006.01)

(52) U.S. Cl.
CPC ................ *E06B 3/549* (2013.01); *E06B 3/02* (2013.01); *E06B 3/5481* (2013.01); *E06B 7/2301* (2013.01); *E06B 3/90* (2013.01)

(58) Field of Classification Search
CPC .......... E06B 3/54; E06B 3/5481; E06B 3/549; E06B 3/5821; E06B 3/90; E06B 3/67386; E06B 7/2301
See application file for complete search history.

(56) References Cited

U.S. PATENT DOCUMENTS 8,590,227 B2 * 11/2013 Coddens ................ E06B 9/264 49/504
8,863,440 B1 * 10/2014 Champlin ................ F41H 5/26 52/204.53

(Continued)

FOREIGN PATENT DOCUMENTS

DE 19501628 2/1996
DE 29801926 6/1998

(Continued)

OTHER PUBLICATIONS

International Search Report and Written Opinion in PCT/EP2021/056908 dated Jun. 29, 2021.
Swedish Search Report in 2030093-5 dated Apr. 14, 2021.

*Primary Examiner* — Ryan D Kwiecinski
(74) *Attorney, Agent, or Firm* — Wissing Miller LLP

(57) ABSTRACT

A panel frame (10) is provided, comprising a first profile (100) having a first structure (102) to support a first side (52) of an associated panel (50), and a second structure (104) to support an edge (56) of the same panel (50), and a second profile (200) being configured to connect to the first profile (100) and comprising a first structure (202) to support a second side (54) of the panel (50). The first profile (100) comprises at least one magnetic portion (120), such that a magnetic member (300) can be attached to the magnetic portion (120) in order to temporary clamp the panel (50) between the magnetic member (300) and the first structure (102) of the first profile (100).

15 Claims, 6 Drawing Sheets

(56) References Cited

U.S. PATENT DOCUMENTS

| | | | | |
|---|---|---|---|---|
| 9,493,978 | B2 * | 11/2016 | Welyki | E06B 3/5418 |
| 10,294,714 | B2 * | 5/2019 | Massey | E06B 9/52 |
| 10,562,274 | B1 * | 2/2020 | Kingman | B32B 17/10165 |
| 10,829,983 | B2 * | 11/2020 | Haba | E06B 3/549 |
| 11,391,083 | B1 * | 7/2022 | Shattuck | E06B 1/52 |
| 2011/0030294 | A1 * | 2/2011 | Clarson | E06B 7/08 52/203 |
| 2015/0197978 | A1 * | 7/2015 | Welyki | E06B 3/56 33/194 |
| 2017/0247937 | A1 * | 8/2017 | Haba | E06B 3/5436 |
| 2020/0232269 | A1 * | 7/2020 | Eisenbarth | E06B 3/549 |
| 2022/0010611 | A1 * | 1/2022 | Rietz | E06B 3/6621 |
| 2022/0065026 | A1 * | 3/2022 | Özden | E06B 3/62 |
| 2023/0122527 | A1 * | 4/2023 | Persson | E06B 7/2301 52/204.62 |

FOREIGN PATENT DOCUMENTS

| | | | | |
|---|---|---|---|---|
| DE | 102009024145 | A1 * | 12/2009 | E06B 3/5409 |
| DE | 202017107747 | U1 * | 5/2019 | E06B 3/54 |
| EP | 1467039 | | 10/2004 | |
| EP | 3396097 | A1 * | 10/2018 | |
| EP | 3633131 | A1 * | 4/2020 | E06B 3/16 |
| FR | 3037985 | A1 * | 12/2016 | |
| FR | 3080402 | A1 * | 10/2019 | E06B 3/54 |
| FR | 3080403 | A1 * | 10/2019 | E06B 3/54 |
| GB | 2552902 | A * | 2/2018 | E06B 3/5481 |
| JP | 5777476 | | 5/1982 | |
| KR | 2015055232 | A * | 5/2015 | E06B 3/54 |
| KR | 101548642 | | 8/2015 | |
| SE | 9603628 | A * | 4/1997 | E06B 3/54 |
| WO | 2017027913 | | 2/2017 | |
| WO | WO-2020147904 | A1 * | 7/2020 | E04D 13/0351 |
| WO | WO-2021185941 | A1 * | 9/2021 | E06B 3/02 |

* cited by examiner

PANEL FRAME AND A METHOD FOR PROVIDING A PANEL

This application is a 371 of PCT/EP2021/056901, filed on Mar. 18, 2021, published on Sep. 23, 2021 under publication number WO 2021/185941, which claims priority benefits from Swedish Patent Application No. 2030093-5, filed on Mar. 19, 2020, the disclosure of which is incorporated herein by reference.

TECHNICAL FIELD

The present invention relates to a panel. In particular, the present invention relates to a frame for a panel, such as revolving or sliding door panel, or even wall panels.

BACKGROUND

Doors, such as revolving doors, are available in various configurations and designed for different applications; e.g. a revolving door may be constructed depending on the number of people that are expected to walk through the revolving door and the particular dimensions to visually fit with an associated building.

One type of a revolving door has a rotating assembly in the form of a central column and at least one door panel connected to the central column and being rotatably arranged around a central axis. Another type of a revolving door has no central column, but a rotating assembly arranged above the ceiling of the revolving door. The rotating assembly is capable of driving one or more center passage pivoted break out doors.

These different types of revolving doors can be automatically controlled to allow access control of the people passing through the door. Revolving doors of these types can therefore be power assisted, i.e. they are equipped with a drive unit, including a motor, and a control unit in communication with the drive unit and programmed to control operation of the revolving door.

For various reasons the door panels are at least to some extent transparent and they are normally produced by one or more large glass panes being surrounded by a frame. The frame is designed to allow the door panel to be attached to the rotating assembly, and optionally also to allow for the possibility to connect seals or other components, such as handle bars, for improving the appearance and functionality of the door panel when used in the associated door.

The door panels can be made rather large, requiring heavy and bulky glass panes. In order to securely attach the frame to the glass pane the frame normally consists of a slotted profile. The glass pane is positioned in the slot, such that the profile supports the edge of the glass pane. As the glass panes grow bigger, it is desired to use lifting devices to support the weight of the glass pane. However, such lifting devices are not designed to move heavy glass panes which desired accuracy such that the glass panes can be fitted in slotted profiles. Therefore, the task of mounting heavy glass panes to slotted profiles is performed by a person. Even so, it becomes more difficult for a person to accurately position the glass pane in the profile slot especially for large glass panes used for door panels, wall panels, etc.

Thus, there exists a need for improved panel frames, especially for use with large-scale applications such as revolving doors or sliding doors, or even wall panels.

SUMMARY

It is an object of the invention to at least partly overcome one or more of the above-identified limitations of the prior art. In particular, it is an object to provide an improved panel frame for allowing facilitated assembly of panels, especially for heavy applications such as big revolving door panels, sliding door panels, or even wall panels.

According to a first aspect, a panel frame is provided. The panel frame comprises a first profile having a first structure to support a first side of an associated pane, and a second structure to support an edge of the same pane, and a second profile being configured to connect to the first profile and comprising a first structure to support a second side of the pane. The first profile comprises at least one magnetic portion, such that a magnetic member can be attached to the magnetic portion in order to temporary clamp the pane between the magnetic member and the first structure of the first profile.

The first structure and the second structure of the first profile may be arranged perpendicular to each other.

The first structure of the first profile may be formed by a vertical wall portion being provided with a strip seal.

The second structure of the first profile may be formed by a horizontal wall portion.

The horizontal wall portion of the first profile may be provided with a friction element.

The first structure of the second profile may be provided with a strip seal.

The second profile may be configured to connect to the first profile by a friction engagement.

The at least one magnetic portion of the first profile may be formed integral with the second structure of the first profile.

According to another embodiment, the at least one magnetic portion of the first profile is formed by the friction element of the second structure of the first profile.

The magnetic member may comprise at least one disc like member.

The height of the at least one disc like member is preferably greater than the thickness of the friction element of the second structure of the first profile.

The panel frame may comprise a plurality of magnetic members being distributed along the length of the first profile.

The panel frame may comprise a set of first profiles being connected to form a rectangular profile assembly, and a set of second profiles connected to set of first profiles in order to form a rectangular panel frame.

According to a second aspect, a panel, such as a wall panel or a door panel, is provided. The panel comprises a pane surrounded by a panel frame according to any of the preceding claims.

According to a third aspect, a method for providing a panel, such as a wall panel or a door panel, is provided. The method comprises i) arranging a pane to a first profile, ii) temporarily securing the position of the pane relative the first profile (100) by means of one or more magnetic members, and iii) connecting a second profile to the first profile, thereby securely clamping the pane between the first and second profiles.

BRIEF DESCRIPTION OF THE DRAWINGS

The present invention will hereinafter be further explained by means of non-limiting examples with reference to the appended schematic figures where.

DETAILED DESCRIPTION

Figure 1A:
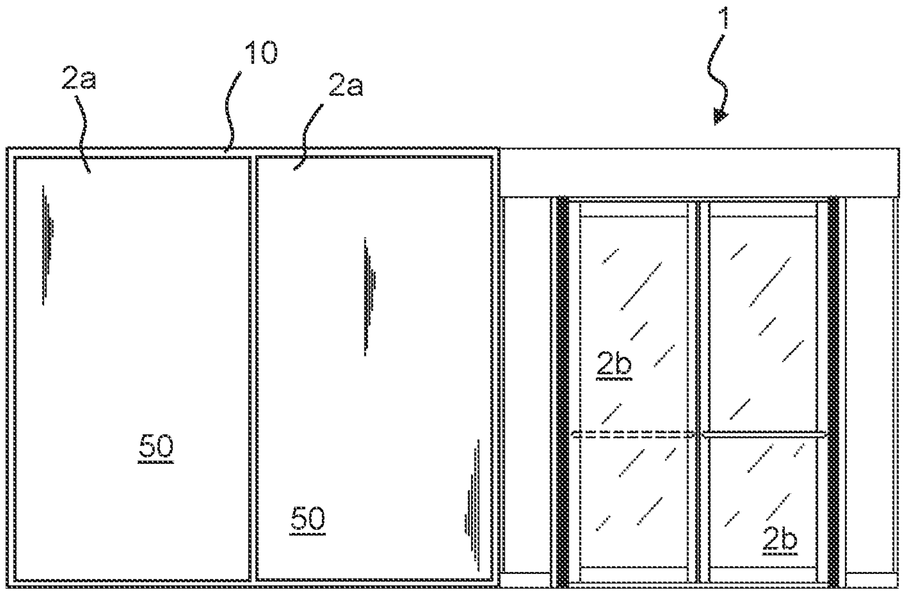
FIG. 1*a* is a front view of a revolving door and wall panels.

Starting in FIG. 1*a*, an environment having a plurality of panels are shown. As will be explained in the following, each one of these panels may be provided with one or more panel frames according to various embodiment.

In FIG. 1*a* a revolving door 1 is shown, being arranged as an entering/exit structure through a building wall. The building wall is formed by a plurality of wall panels 2*a*, wherein each wall panel 2*a* comprises a pane 50, such as a glass pane, being surrounded by an associated panel frame 10.

Figure 1B:
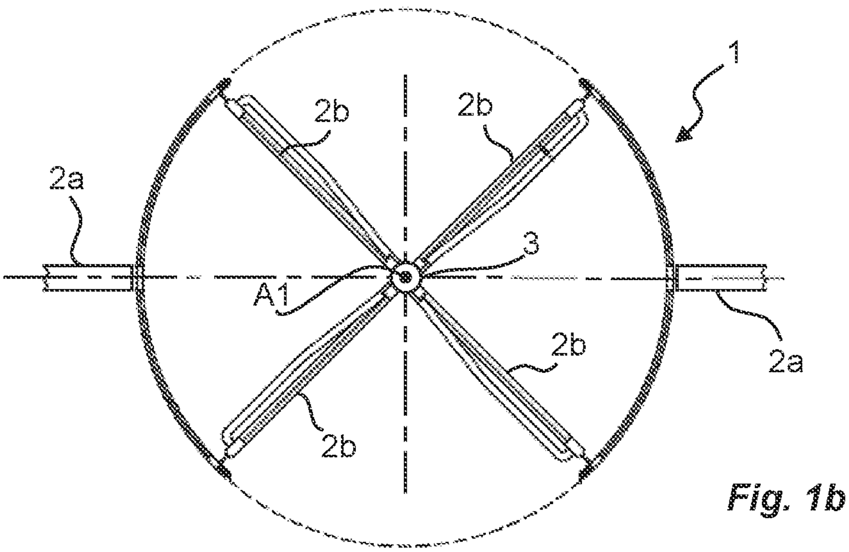
FIG. 1*b* is a cross-sectional view of the revolving door shown in FIG. 1*a;*

The revolving door 1, used to allow people to enter and/or exit the area behind the building wall, is further shown in FIG. 1*b*. The revolving door 1 comprises one or more door panels 2*b*, in the shown example there are four door panels 2*b*. The door panels 2*b* are connected to a rotating assembly in the form of a central column 3 and rotatably arranged around a central axis A1. As revolving doors are well known within the art, no further explanation of the details of the revolving door will be given herein, except for the construction of the door panels 2*b*.

Figure 1D:
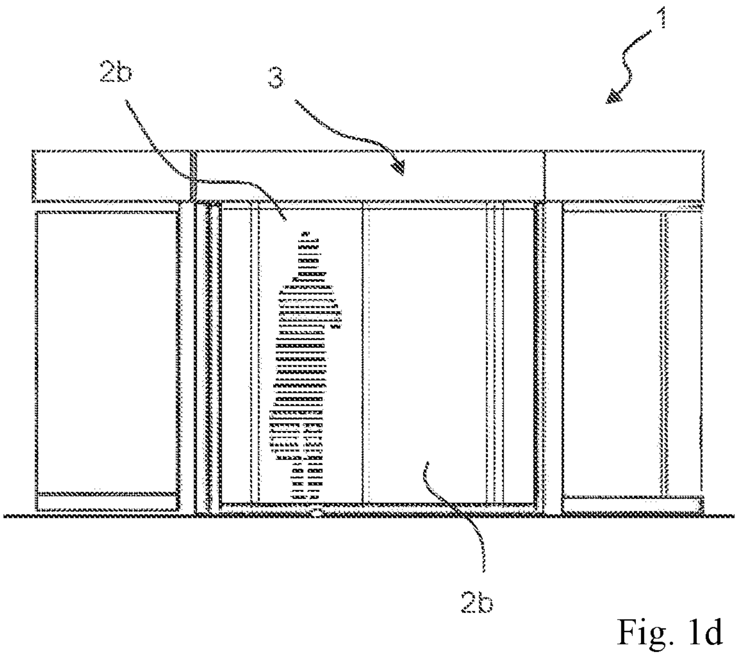
FIGS. 1*c* and 1*d* show different views of a revolving door according to a further embodiment.
Figure 1C:
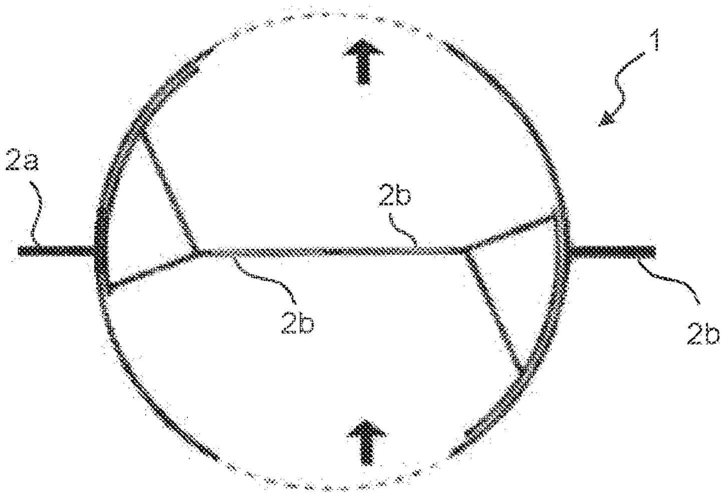

Another example of a revolving door 1 is shown in FIGS. 1*c* and 1*d*. For this embodiment there is no central column but the rotating assembly 3 is formed by a wheel assembly accommodated above the ceiling of the revolving door 1. The door panel 2*b* is connected to the wheel assembly at their respective upper portion.

Figure 2:
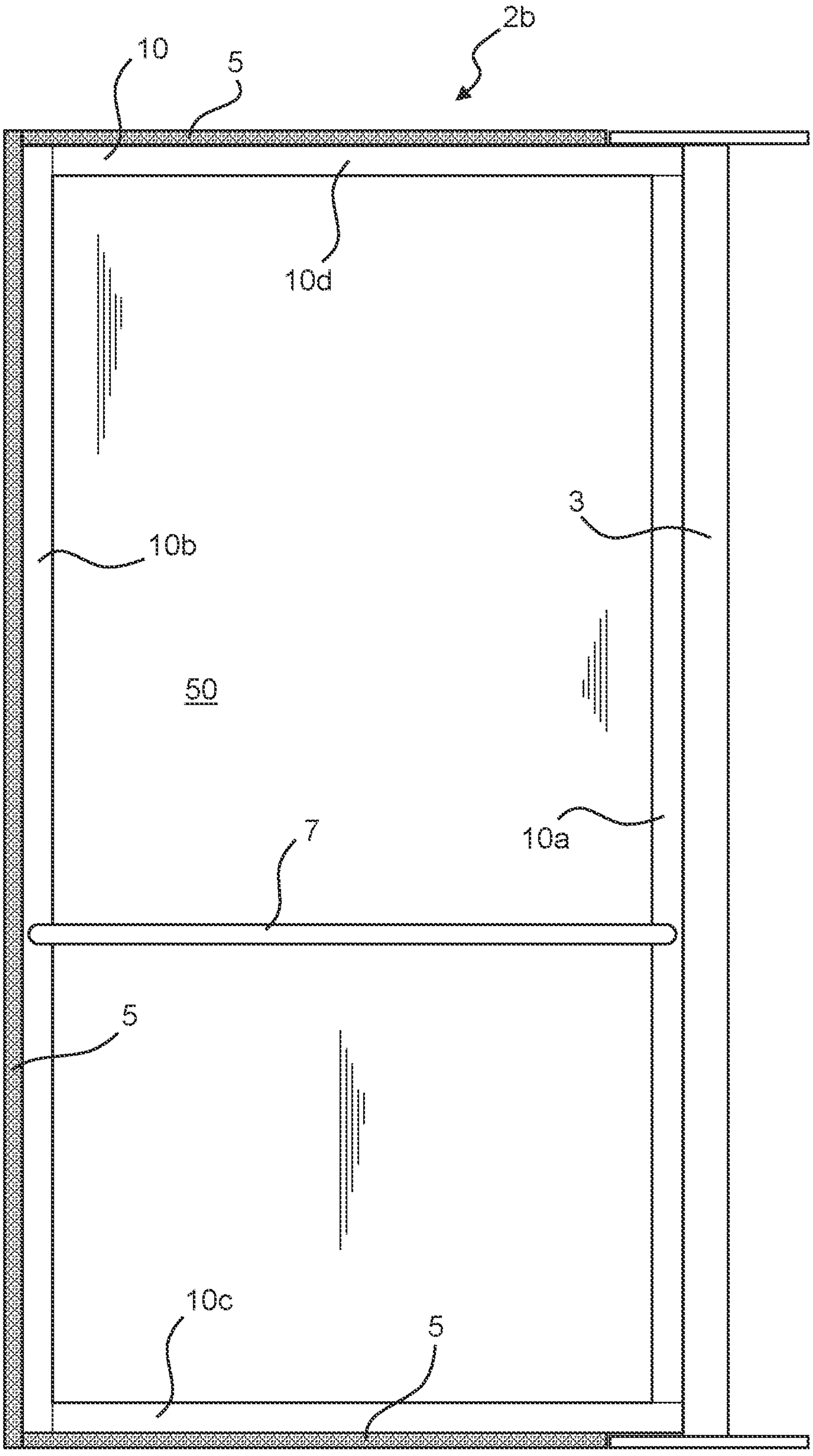
FIG. 2 is a front view of a door panel according to an embodiment.

An example of a door panel 2*b* for use with a revolving door 1 is shown in FIG. 2. However, it should be realized that the description relating to the panel frame 10 would be equally valid for a wall panel 2*a*, or for any other panels of similar construction such as sliding door panels, etc.

The door panel 2*b* comprises a rectangular glass pane 50 being surrounded on all edges by a panel frame 10. The panel frame 10 comprises four connected linear frame members 10*a-d*, thereby forming a rectangular panel frame 10. A first frame member 10*a* is forming a vertical frame member, optionally being configured to allow for connection with the central column 3 of the revolving door 1. A second frame member 10*b* forms an opposite vertical frame member. Two horizontal frame members 10*c-d* are connecting the vertical frame members 10*a-b* to each other. Optionally, an upper horizontal frame member 10*d* is configured to allow for connection with the rotating assembly 3 arranged above the ceiling of the revolving door 1.

The radially outer frame member 10*b*, as well as the two horizontal frame members 10*c-d*, may be connected to additional components such as brushes 5 in order to improve the appearance and functionality of the revolving door 1. Moreover, as can be seen in FIG. 2 the vertical frame members 10*a-b* are connected to a handle bar 7 extending horizontally across the pane 50.

Figure 3:
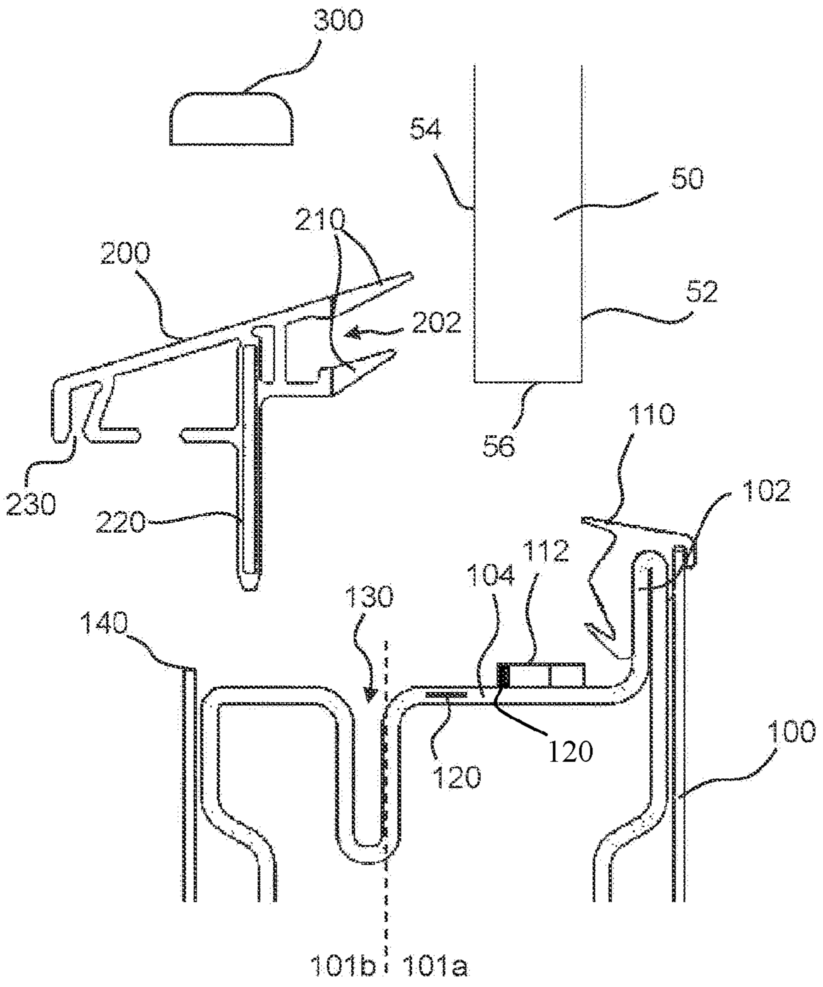
FIG. 3 is a cross-sectional view of a panel frame in a non-assembled state, according to an embodiment.

Now turning to FIG. 3, details of the panel frame 10 will be further described. As can be seen, the panel frame 10 is formed by two main components; a first profile 100, and a second profile 200. As will be further explained, also a magnetic member 300 is required to assemble the panel frame 10.

It should be noted that while the panel frame 10 typically comprises a number of interconnected frame members 10*a-d*, each frame member 10*a-d* may be formed by the components shown in FIG. 3, i.e. the first profile 100 and the second profile 200. For the sake of simplicity, however, the term "panel frame" will be used although that it should be understood that in practice, a panel frame 10 has several frame member 10*a-d*.

The first profile 100, preferably being formed by aluminum or any other suitable metal, is an elongated structure preferably having a length being equal to the length of one side of the pane 50. However, as will be understood from the following it may be advantageous to provide the first profile 100 of a material being magnetic at least to some parts thereof.

A first side 101*a* of the first profile 100 is configured to engage with the pane 50, while the opposite side 101*b* of the first profile 100 is configured to engage with the second profile 200.

The first profile 100 is for this purpose provided with a first structure 102 to support a first side 52 of the pane 50, and a second structure 104 to support an edge 56 of the same pane.

The first and second structures 102, 104 are both arranged on the first side 101*a* of the first profile. Further, the first and second structures 102, 104 of the first profile 100 are arranged perpendicular to each other; while the first structure 102 is formed as a vertical wall of the profile 100, the second structure 104 is formed as a horizontal wall of the profile 100. Preferably, the first and second structures 102, 104 are formed as two connected sections of the same piece of material, being bent by 90°.

As the first structure 102, i.e. the vertical wall portion, is intended to contact the first side 52 of the pane 50, a strip seal 110 is provided. The strip seal 110 is facing inwards, i.e. towards the second side 101*b* of the first profile 100.

The second structure 104, i.e. the horizontal wall portion, is on the other hand provided with a friction element 112. The friction element 112, e.g. in the form of a rubber strip or similar, is a thin sheet extending at least along a part of the length of the first profile 100. The friction element 112 improves positioning of the pane 50 against the first profile 100, and assists in maintaining the position of the pane 50 during assembly, as well as when mounted in the finished panel frame.

The first side 101*a* of the first profile 100 is further provided with a magnetic portion 120. The magnetic portion 120 is provided at the second structure 104, i.e. at the area intended to support the edge 56 of the pane 50. The magnetic portion 120 may run along the complete length of the first profile 100, or it may be provided as at least one distinct magnetic area. For example, the magnetic portion may be formed integral with the horizontal wall portion 104, as part of the friction element 112, or as a separate component being attached to the horizontal wall portion 104.

While the magnetic portion 120 is shown as an embedded part in FIG. 3, the magnetic portion 120 could equally well be arranged on any surface of the horizontal wall portion 104.

The second profile 200 is configured to connect to the first profile 100. For this, the second side 101*b* of the first profile 100 is provided with a U-shaped structure 130. The U-shaped structure 130 is arranged adjacent to the horizontal wall portion 104 and directed downwards, i.e. on a second side 54, i.e. an inner side of the side 54, of the pane 50. The first profile 100 may also be provided with a protruding pin 140, extending vertically upwards, and arranged remote from the U-shaped structure 130. Hence, the U-shaped structure 130 is arranged between the protruding pin 140 and the horizontal wall portion 104.

Now turning to the second profile 200, a first structure 202 is intended to face the inner side 54 of the pane 50, i.e. the second side 54 of the pane 50. The second profile 200, preferably being formed by aluminum or any other suitable metal, is an elongated structure preferably having a length being equal to the length of the first profile 100.

The first structure 202 is provided with a strip seal 210 configured to engage with the inner side of the pane 50. The second profile 200 further comprises a downwardly extending rod 220, configured to be pressed into the U-shaped structure 130 of the first profile 100, and a vertical recess 230 configured to receive the protruding pin 140 of the first profile 100. The distance between the rod 220 and the recess 230 corresponds to the distance between the U-shaped structure 130 and the pin 140.

The magnetic member 300 is a disc like member of a magnetic material, configured to attract to the magnetic portion 120 of the first profile 100. The height of the magnetic member 300 is set such that it will extend to some extent along the inner side 54 of the pane 50, i.e. the second side of the pane 50, while still fit underneath the second profile 200. Hence, the height of the magnetic member 300 approximately equals the difference between the length of the rod 220 of the second profile 200 and the depth of the U-shaped structure 130 of the first profile 100. The width of the magnetic member 300 approximately equals the width of the horizontal wall portion 104 of the first profile 100 minus the thickness of the pane 50.

Figure 4:
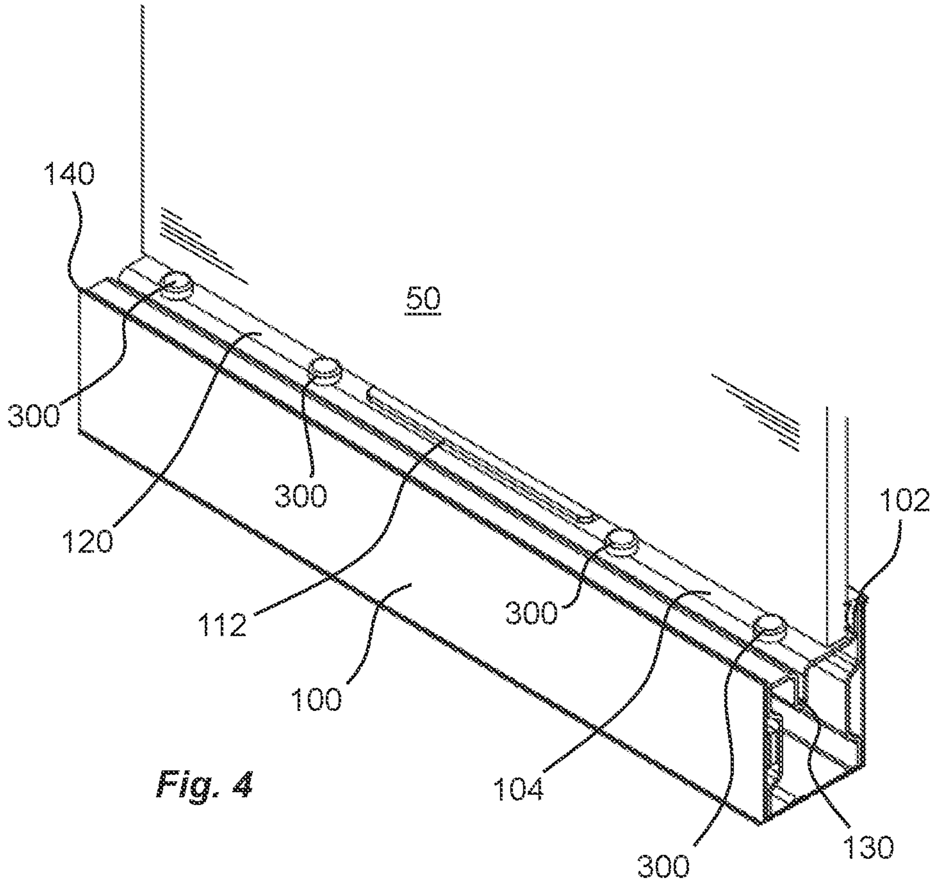
FIG. 4 is an isometric view of a panel frame in a semi-assembled state, according to an embodiment.

A semi-assembled panel frame 10 is shown in FIG. 4. Here, the pane 50, the first profile 100, and a plurality of magnetic members 300 are shown. It can be seen that the pane 50 is arranged in contact with the first structure 102 as well as with the second structure 104, as the edge of the pane 50 is arranged onto the friction element 112 and pressed towards the first structure 102. For temporarily securing the pane 50 at the desired position, four magnetic members 300 are used. These are attaching directly to the horizontal wall portion 104 of the first profile, as the magnetic portion 120 of the first profile extends along the horizontal wall portion 104. Hence, the entire horizontal wall portion 104 may be made magnetic, or separate magnetic areas may be provided for ensuring correct positioning of the magnetic members 300. In case of the latter, these magnetic areas may be indicated by a visual mark for facilitating assembly.

Once the magnetic members 300 have been attached to the first profile 100, the pane 50 is temporarily fixated and the person responsible for the assembly may handle the second profile 200 and connect it to the first profile 100. This is performed by arranging the second profile 200 at an angle such that the pin 140 is received in the recess 230, and thereafter tilting the second profile 200 towards the pane 50 such that the rod 220 enters the U-shaped structure 130 of the first profile 100. By further pushing down the second profile 200, it will be securely fixated to the first profile 100.

As has been explained, there is no need to remove the magnetic members 300 before connecting the second profile 200 to the first profile 100, as these fit beneath the second profile 200.

Figure 5:
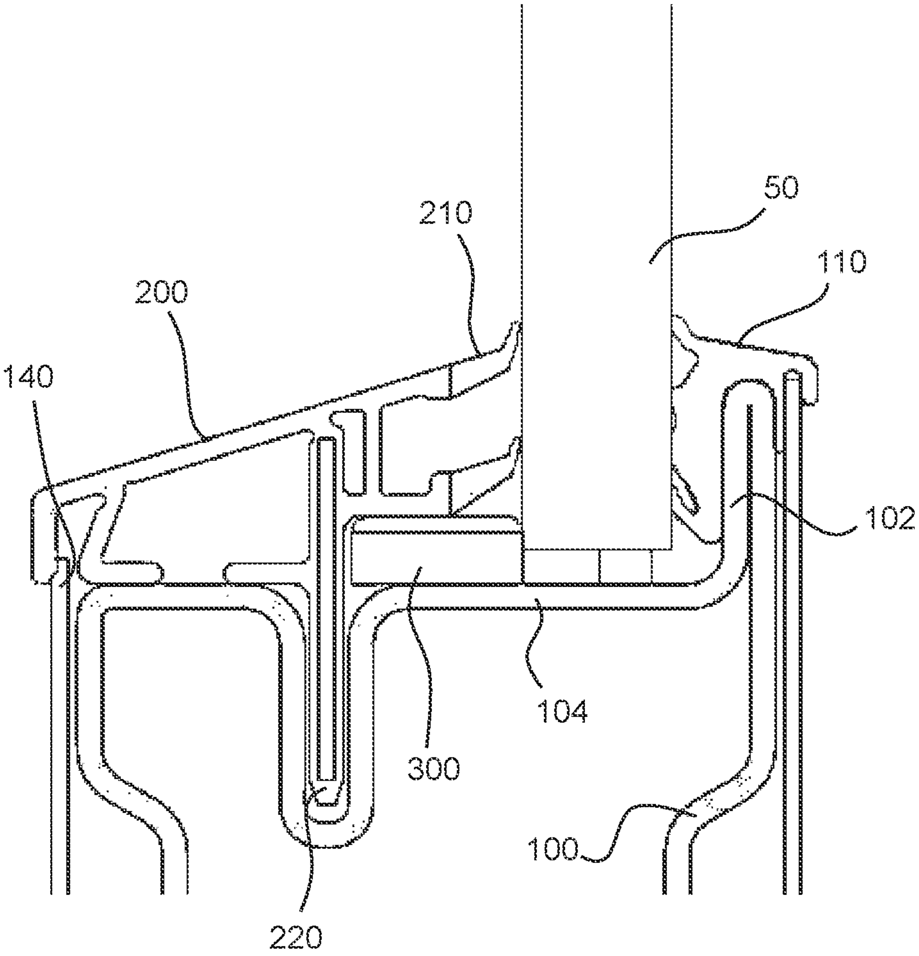
FIG. 5 is a cross-sectional view of the panel frame shown in FIG. 3 in an assembled state.

The assembled panel frame 10 is shown in FIG. 5. In this state the second profile 200 is clamping the pane 50 towards the vertical wall portion 102 of the first profile 100 as the rod 220 is fully pushed into the U-shaped structure, while the pin 140 is received in the recess 230. The strip seals 210, 110 provides a full sealing against moisture and dirt so that the rigid connection of the panel frame 10 will last for a very long time.

It should be noted that although the first and second profiles 100, 200 have been described in detail, the exact configuration of these may vary widely as long as they allow for a temporary fixation of the pane 50 to the first profile 100 by means of one or more magnetic members 300, and further a secure and durable fixation of the pane 50 by clamping the pane 50 between the first and second profiles 100, 200.

Optionally, the at least one magnetic member 300 is left inside the panel frame 10 once fully assembled, or at least some may be removed prior to final connection of the second profile 200 to the first profile 100.

Yet further, the magnetic member 300 may have any suitable configuration as long as it is capable of providing a temporary fixation of the pane 50 to the first profile 100. For example, the magnetic member 300 may be an elongated strip instead of a disc like member, or similar.

Figure 6:
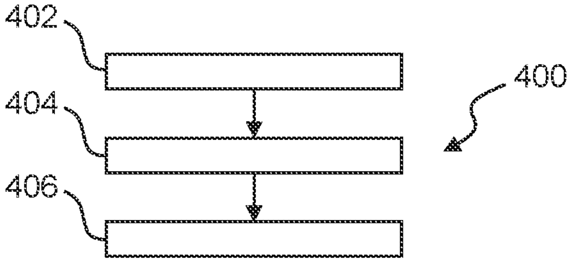
FIG. 6 is a schematic view of a method according to an embodiment.

Now turning to FIG. 6 a method 400 for providing a panel 2*a-b*, such as a wall panel or a door panel, is schematically shown. The method 400 comprises arranging 402 a pane 50 to a first profile 100, temporarily 404 securing the position of the pane 50 relative the first profile 100 by means of one or more magnetic members 300, and connecting 406 a second profile 200 to the first profile 100, thereby securely clamping the pane 50 between the first and second profiles 100, 200.

It is apparent to a person skilled in the art that the basic idea may be implemented in various ways. The invention and its embodiments are thus not limited to the examples described above; instead they may vary within the scope of the claims.

The invention claimed is:

1. A panel frame, comprising
- a first profile having a first structure to support a first side of an associated pane,
- a second structure to support an edge of the same pane,
- a second profile being configured to connect to the first profile and comprising a first structure to support a second side of the pane, wherein said first profile comprises at least one magnetic portion, and
- a magnetic member adapted to attach to the magnetic portion and to abut the pane in order to temporarily clamp the pane between the magnetic member and the first structure of the first profile.

2. The panel frame according to claim 1, wherein the first structure and the second structure of the first profile are arranged perpendicular to each other.

3. The panel frame according to claim 1, wherein the first structure of the first profile is formed by a vertical wall portion being provided with a strip seal.

4. The panel frame according to claim 1, wherein the second structure of the first profile is formed by a horizontal wall portion.

5. The panel frame according to claim 4, wherein the horizontal wall portion of the first profile is provided with a friction element.

6. The panel frame according to claim 5, wherein the magnetic portion of the first profile is formed by the friction element of the second structure of the first profile.

7. The panel frame according to claim 1, wherein the first structure of the second profile is provided with a strip seal.

8. The panel frame according to claim 1, wherein the second profile is configured to connect to the first profile by a friction engagement.

9. The panel frame according to claim 1, wherein the magnetic portion of the first profile is formed integral with the second structure of the first profile.

10. The panel frame according to claim 1, wherein the magnetic member comprises at least one disc like member.

11. The panel frame according to claim 10, wherein the second structure of the first profile comprises a friction element, and wherein a height of the at least one disc like member is greater than a thickness of the friction element.

12. The panel frame according to claim 10, wherein the magnetic member comprises a plurality of magnetic members and wherein the plurality of magnetic members are distributed along a length of the first profile.

13. The panel frame according to claim 1, comprising a set of first profiles being connected to form a rectangular profile assembly, and a set of second profiles connected to set of first profiles in order to form a rectangular panel frame.

14. A panel comprising a pane surrounded by a panel frame according to claim 1, wherein the panel is a wall panel or a door panel.

15. A method for providing a panel including a panel frame according to claim 1 comprising:

arranging the associated pane to the first profile;

temporarily securing a position of the pane relative the first profile by means of the magnetic member, and connecting the second profile to the first profile, thereby securely clamping the pane between the first and second profiles.

* * * * *